July 8, 1969 P. B. PAGE 3,454,903
TEMPERATURE COMPENSATION OF CRYSTAL OSCILLATORS
Filed Aug. 14, 1967 Sheet 2 of 3
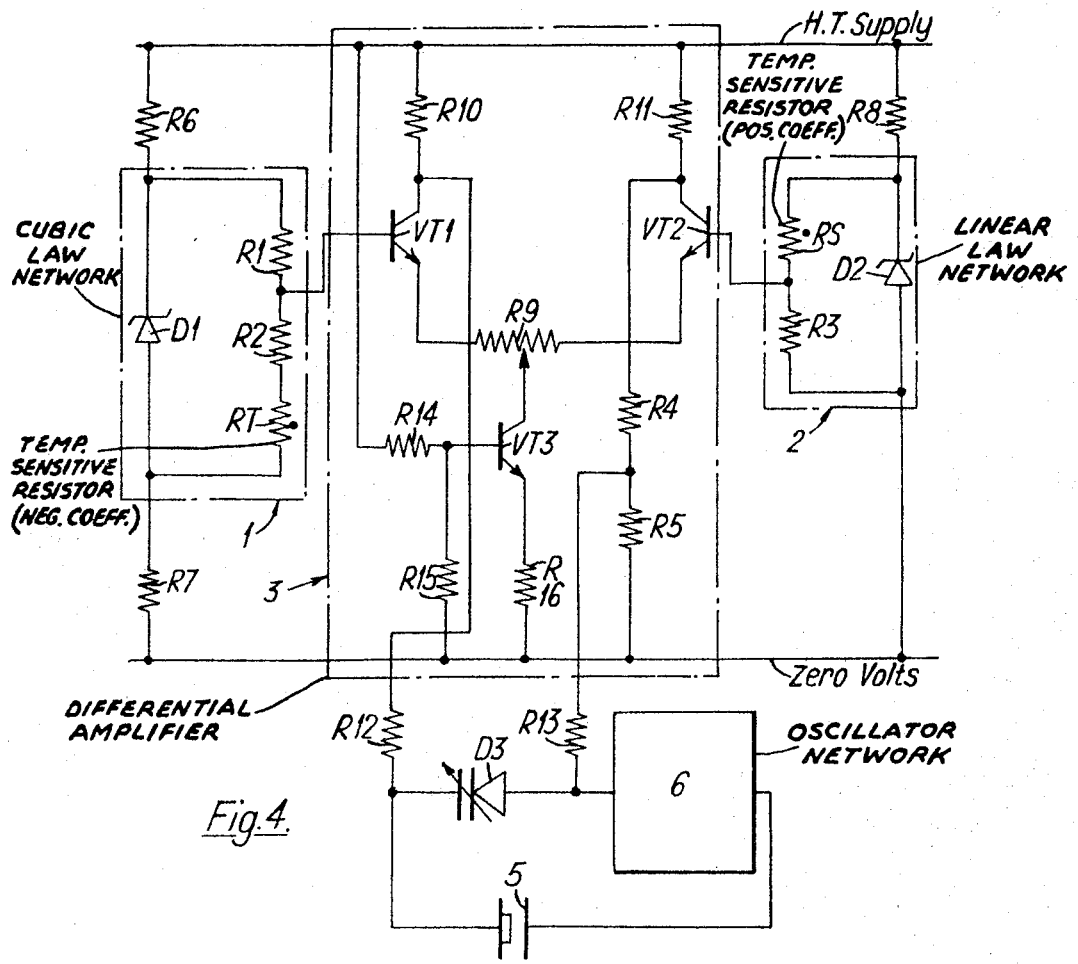
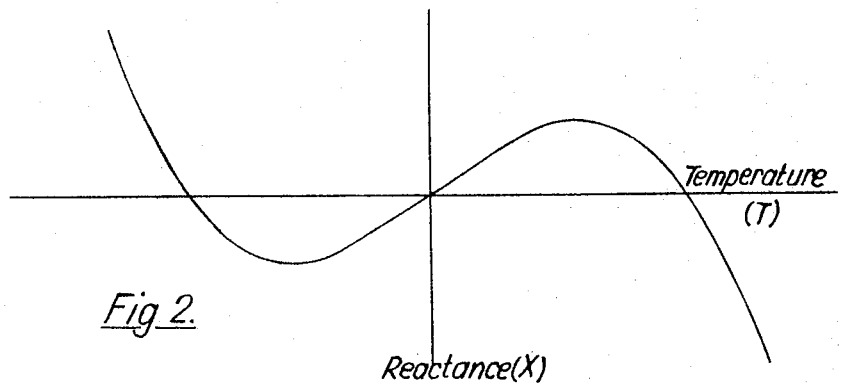
Inventor
PETER B. PAGE
By Alfred C. Hill
Agent

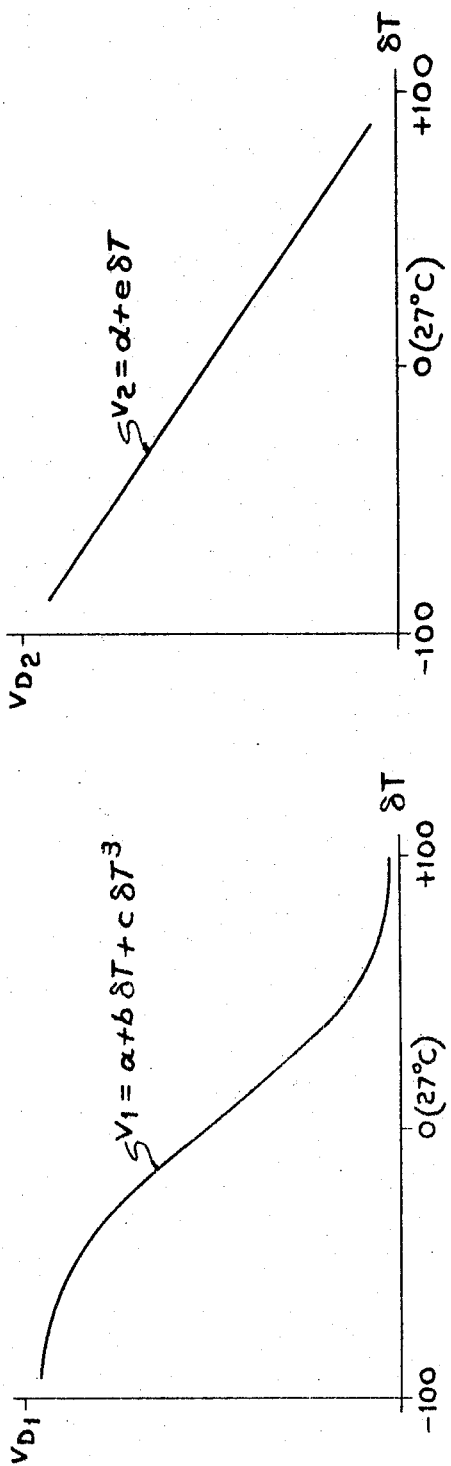
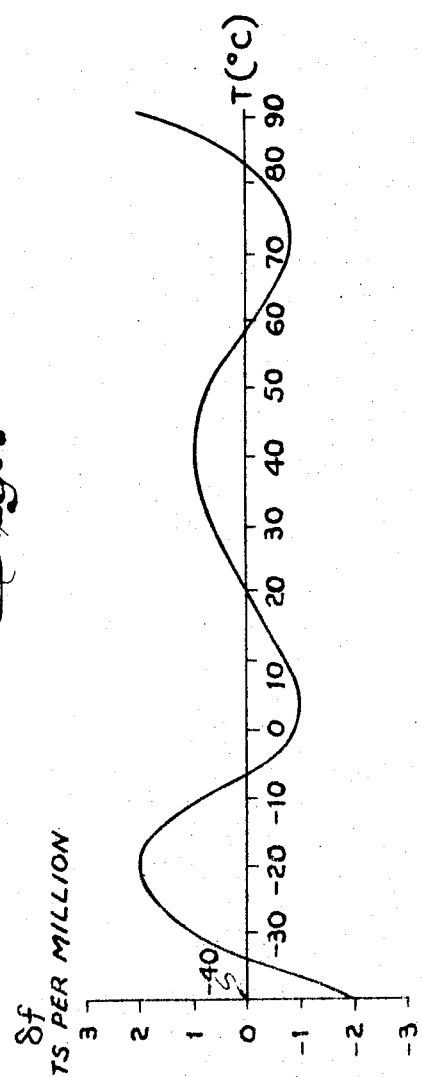

United States Patent Office 3,454,903
Patented July 8, 1969

3,454,903
TEMPERATURE COMPENSATION OF CRYSTAL OSCILLATORS
Peter Bernard Page, London, England, assignor to International Standard Electric Corporation, New York, N.Y., a corporation of Delaware
Filed Aug. 14, 1967, Ser. No. 660,402
Claims priority, application Great Britain, Aug. 16, 1966, 36,536/66
Int. Cl. H03b 5/30, 5/36, 3/04
U.S. Cl. 331—116                                     8 Claims

ABSTRACT OF THE DISCLOSURE

The temperature coefficient of an AT-cut crystal has a fixed cubic term together with a linear term which is a function of the cutting angle of the crystal. A variable capacitance diode is coupled to the crystal to be temperature compensated. Temperature compensation is achieved by altering the bias voltage of the variable capacitance diode by means of separate linear and cubic temperature sensitive networks through a differential amplifier.

Background of the invention

The invention relates to temperature compensating arrangements for correcting frequency variations due to temperature changes in systems employing crystal oscillators.

Summary of the invention

The invention provides a temperature compensating arrangement for correcting frequency variations due to temperature changes in systems employing crystal oscillators comprising a first compensating network having a prescribed voltage-temperature characteristic, a second compensating network having a different voltage-temperature characteristic than said first compensating nework, means coupled to the first and second networks for obtaining the difference voltage between the outputs of the first and second networks, and a variable reactance connected to the means and the crystal to be compensated, wherein the difference voltage which varies with temperature and the reactance-voltage characteristic of the variable reactance are arranged such that the resonance frequency of the crystal oscillator is maintained constant over a selected working temperature range.

Brief description of the drawing

The above mentioned and other features and objects of this invention will become more apparent by reference to the following description taken in conjunction with the accompanying drawings, in which:

FIG. 2 illustrates a reactance-temperature curve for an AT-cut crystal at a fixed frequency;

FIG. 4 is a schematic diagram of the blocks 1 to 5 of FIG. 3;

FIG. 5 is a theoretical curve illustrating the voltage-temperature characteristic of block 1 of FIG. 3;

FIG. 6 is a theoretical curve illustrating the voltage-temperature characteristic of block 2 of FIG. 3; and FIG. 7 is a theoretical curve illustrating the temperature-frequency characteristic of a compensated oscillator constructed according to the invention.

Description of the preferred embodiment

Figure 1:
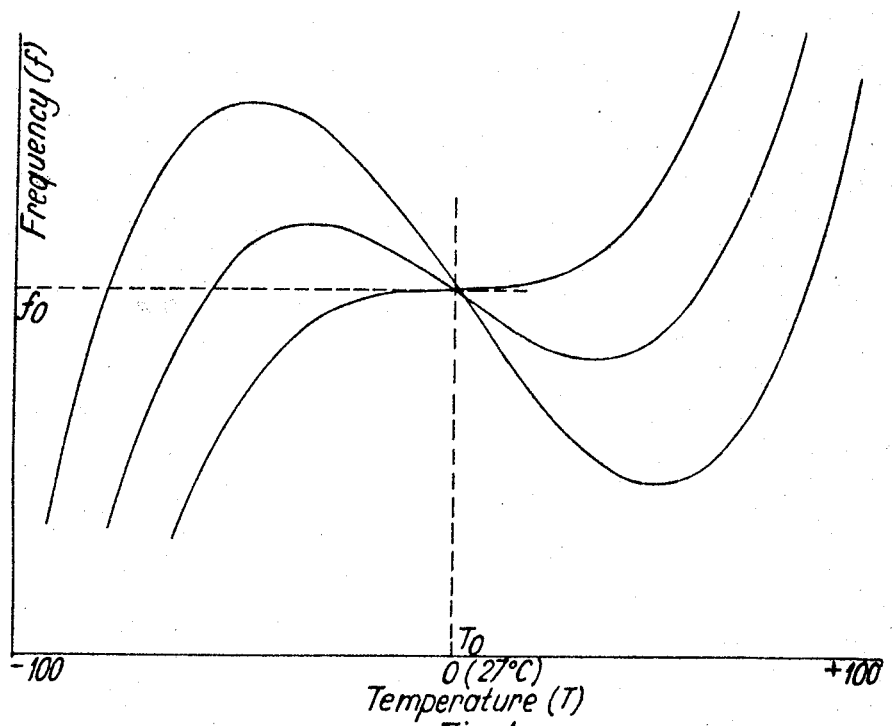
FIG. 1 illustrates a family of frequency-temperature curves for an AT-cut quartz crystal.

The frequency of a quartz crystal oscillator changes with temperature mainly due to the temperature coefficient of the AT-cut crystal which has mainly a fixed cubic term together with a linear term which is a function of the cutting angle. A family of frequency-temperature curves for an AT-cut crystal are shown in the drawing according to FIG. 1.

Referring to FIG. 1, the family of curves are approximately symmetrical about the point with coordinates $f_0$, $T_0$, where $f_0$ is the frequency of the crystal at the inflexion temperature $T_0$ (approximately 27° C. for the AT-cut crystal).

For a given crystal unit design, the different curves are obtained by slightly changing the angle at which the crystal element is cut from the quartz crystal and as previously stated the different curves have a fixed cubic term but a different linear term.

Referring to FIG. 2, the reactance-temperature curve for an AT-cut crystal of one particular angle is shown for the frequency $f_0$. The reactance which, connected in series with the crystal, would bring the frequency back to $f_0$ is equal to the negative of the crystal reactance. The inverse of the curve according to FIG. 2 is substantially identical in shape to the frequency-temperature curve from which it is derived, since the crystal reactance is proportional to frequency deviation where this is small.

If a variable reactance, for example, a variable capacitance diode, is connected in series or in parallel (depending on the oscillator circuit) with an AT-cut crystal unit, variation of this reactance in the manner outlined above will cause the crystal oscillators resonance frequency to be maintained substantially constant over a selected working temperature range.

Figure 3:
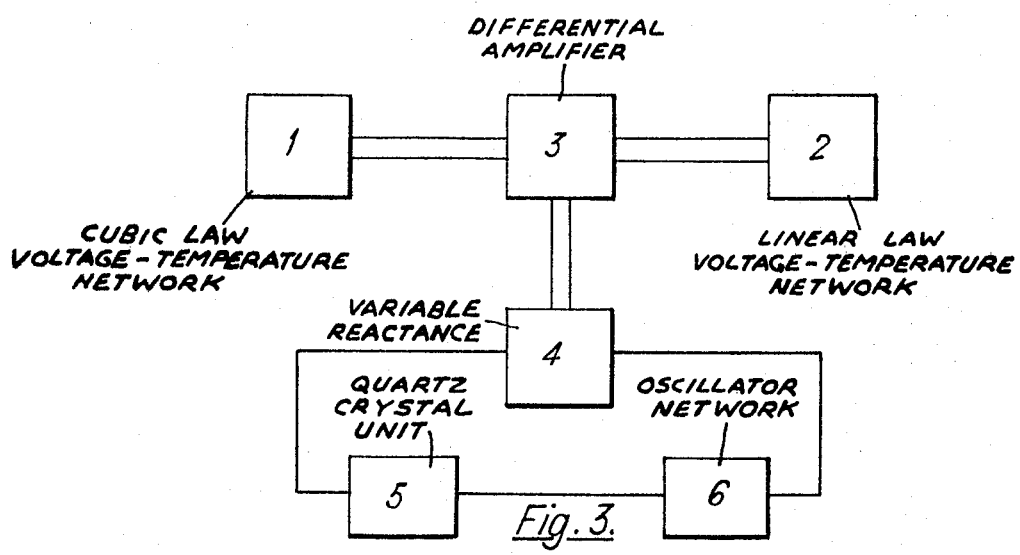
FIG. 3 is a block diagram of a temperature compensating arrangement according to the principles of the present invention for correcting frequency variations due to temperature changes in a system which employs a quartz crystal oscillator.

The block diagram of FIG. 3, which comprises cubic law voltage-temperature network 1, linear law voltage-temperature network 2, differential amplifier 3, a variable reactance 4, quartz crystal unit 5, and oscillator network 6, illustrates a method of varying variable reactance 4 with separate linear and cubic temperature sensitive networks through a differential amplifier in order to compensate for the temperature coefficient effect.

FIG. 4 illustrates a schematic circuit diagram for blocks 1 to 5 of FIG. 3. Cubic law voltage-temperature network 1 having a voltage-temperature characteristic as shown in FIG. 5, and representing the equation $a+b\delta T+c\delta T^3$, comprises Zener diode D1 shunted by resistance R1 connected in series with resistance R2 and temperature sensitive resistance RT having a negative temperature coefficient, for example, a thermistor. The anode of Zener diode D1 is connected to the zero volts supply terminal by resistance R7 while the cathode is connected to the H.T. supply terminal by resistance R6. This network also produces some linear terms as well as the cubic terms.

Linear low voltage-temperature network 2 having a voltage-temperature characteristic as shown in FIG. 6, and representing the equation $d+e\delta T$, comprises Zener diode D2 shunted by temperature sensitive resistance RS having a positive temperature coefficient, for example, a silicon resistor, connected in series with resistance R3. The cathode of Zener diode D2 is connected to the H.T. supply terminal by resistance R8 while the anode is connected directly to the zero volts supply terminal.

Differential amplifier 3 comprises transistors VT1, VT2 and VT3. The emitters of transistors VT1 and VT2 are connected by variable resistance R9, the slider arm of which is connected to the collector of transistor VT3. The collector of transistor VT1 is connected to the H.T. supply line by resistance R10 and to the cathode of variable capacitance diode D3, which forms variable reactance 4 for the system, by resistance R12. The collector of transistor VT2 is connected to the H.T. supply line by resistance R11 and to the zero volts supply line by resistance R4 and resistance R5 connected in series. The junction between resistances R4 and R5 is connected to the anode of variable capacitance diode D3 by resistance R13.

The base of transistor VT3 is connected to the H.T. supply terminal by resistance R14 and to the zero volts supply terminal by resistance R15 and the emitter of this transistor is connected to the zero volts supply terminal by resistance R16.

The base of transistor VT1 is connected to the junction between resistances R1 and R2 which form part of cubic law voltage-temperature network 1 and the base of transistor VT2 is connected to the junction between resistances RS and R3 which form part of linear law voltage-temperature network 2.

Quartz crystal unit 5 which is illustrated in FIG. 4 by AT-cut crystal unit 5 is connected in series with variable capacitance diode D3.

The value of resistance RT (FIG. 4) is selected in conjunction with resistances R1 and R2 in order to provide at the base of transistor VT1 a voltage which varies with temperature in accordance with a cubic law and the value of resistance RS is selected in conjunction with resistance R3 in order to provide at the base of transistor VT2 a voltage which varies with temperature in accordance with a linear law. The output level of cubic and linear law voltage-temperature networks 1 and 2 as applied to variable capacitance diode D3 by differential amplifier 3 are respectively determined by Zener diodes D1 and D2 which are respectively selected in conjunction with resistances R10 and R11.

As previously stated, variable capacitance diode D3 is connected in the output circuit of differential amplifier 3 and will, therefore, have its bias voltage varied in accordance with the difference between the voltage outputs from the linear law and the cubic law networks. The bias voltage will be in the form $K[(a-d)+(b-e)\delta T+c\delta T^3]$ where K represents a constant of the amplifier. Since the reactance of variable capacitance diode D3 is the inverse of the voltage applied thereto, by arranging the difference voltage output from differential amplifier 3 to vary with temperature in the same manner as the reactance of crystal unit 5 varies with temperature, i.e., as illustrated in FIG. 2, the reactance which is connected in series with crystal unit 5 will be the negative of the crystal reactance and will, therefore, maintain the resonance frequency of crystal oscillator network 6 substantially constant over a selected working temperature range as shown in FIG. 7.

The values of resistances $R_6$ and $R_7$ are selected such that the output of the cubic law voltage-temperature network at the inflexion temperature $T_0$, which as previously stated is applied to the base of transistor VT1, causes the voltage at the collector of transistor VT1 to balance with the voltage at the collector of transistor VT2.

The values of resistances R4 and R5 are selected such that at the inflexion temperature $T_0$ variable capacitance diode D3 is biased to a voltage level which will cause a reactance to be connected in series with AT-cut crystal unit 5 which will allow oscillator unit 6 to oscillate at the frequency $f_0$, i.e., the inflexion temperature $T_0$ frequency. Thus it is seen that the term $d$ of the equation representing FIG. 6 is thereby controlled.

The cubic law voltage-temperature network for AT-cut crystal unit 5 is largely the same for any angle of cut but the linear law voltage-temperature network requires readjustment for different angles of cut in order to obtain the correct bias voltage variation for capacitance diode D3. This can be carried out quite simply by re-adjusting the value of resistance R3 in conjunction with resistance RS, and in this manner the term $e$ of the equation representing FIG. 6 is controlled.

Th tolerance of the AT-cut crystal units dynamic capacitance may be corrected by adjusting the gain of differential amplifier 3 and the common mode rejection in differential amplifier 3 reduces the stability requirements for the power supply used for cubic and linear law voltage-temperature networks 1 and 2.

While I have described above the principles of my invention in connection with specific apparatus it is to be clearly understood that this description is made only by way of example and not as a limitation to the scope of my invention as set forth in the objects thereof and in the accompanying claims.

I claim:

1. A temperature compensating arrangement for correcting frequency variations due to temperature changes in systems employing crystal oscillators comprising:
   a first compensating network having a cubic voltage-temperature characteristic;
   a second compensating network having a linear voltage-temperature characteristic;
   means coupled to said first and second networks for obtaining the difference voltage between the outputs of said first and second networks; and
   a variable reactance connected to said means and the crystal to be compensated to vary the reactance so as to control the resonance frequency of the crystal oscillator.

2. An arrangement according to claim 1, wherein said means include:
   a differential amplifier having one input coupled to the output of said first network, the other input coupled to the output of said second network, and the output coupled to said variable reactance.

3. An arrangement according to claim 1, wherein: said crystal to be compensated is an AT-cut quartz crystal.

4. An arrangement according to claim 1, wherein said variable reactance includes:
   a variable capacitance diode connected in series with said crystal to be compensated.

5. An arrangement according to claim 1, wherein said first network includes:
   a Zener diode, and
   a series circuit shunting said diode including:
      a first resistance,
      a second resistance, and
      a temperature sensitive resistance having a negative temperature coefficient;
   the resistance value of said first and second resistances being selected in conjunction with said temperature sensitive resistance in order to obtain a cubic law voltage-temperature characteristic; and
   the output from said first network is taken from the junction between said first and second resistances.

6. An arrangement according to claim 5, wherein said temperature sensitive resistance includes:
   a thermistor.

7. An arrangement according to claim 1, wherein said second network includes:
   a Zener diode, and a series circuit shunting said diode including:
      a resistance, and
      a temperature sensitive resistance having a positive temperature coefficient;
   the resistance value of said resistance is selected in conjunction with said temperature sensitive resistance in order to obtain a linear law voltage-temperature characteristic; and
   the output from said second network is taken from the junction between said resistance and said temperature sensitive resistance.

8. An arrangement according to claim 7, wherein said temperature sensitive resistance includes:
a silicon resistor.

References Cited

UNITED STATES PATENTS

| | | | |
|---|---|---|---|
| 3,054,966 | 9/1962 | Etherington | 331—176 |
| 3,176,244 | 3/1965 | Newell et al. | 331—116 |
| 3,200,349 | 8/1965 | Bangert | 331—176 |
| 3,208,007 | 9/1965 | Schodowski | 331—116 |
| 3,322,981 | 5/1967 | Brenig | 331—116 |
| 3,373,379 | 3/1968 | Black | 331—116 |

FOREIGN PATENTS 1,020,080  2/1966  Great Britain.

JOHN KOMINSKI, *Primary Examiner.*

U.S. Cl. X.R.

331—176